Patented Apr. 9, 1946

2,397,919

UNITED STATES PATENT OFFICE 2,397,919

STABILIZATION OF ZEIN SOLUTIONS

John R. Caldwell, Kingsport, Tenn., assignor to Eastman Kodak Company, Rochester, N. Y., a corporation of New Jersey No Drawing. Application September 14, 1943, Serial No. 502,319

5 Claims. (Cl. 106—153)

This invention relates to a stabilization of solutions of zein in aqueous acetone or aqueous alcohol by incorporating therein a small proportion of a water-soluble thiocyanate.

Zein, the protein derived from corn, is unique among the commercially available proteins by virtue of the fact that it is soluble in many organic solvents. This makes it especially valuable for many purposes. In spite of the desirable properties of zein and the large amount which is commercially available, that protein has never found wide application. This is thought to be due to the fact that zein solutions gradually increase in viscosity until a gel is formed. This change usually takes place within 24 to 48 hours and therefore, unless the solution is to be employed within a short time, it becomes unsuitable for use. In most cases the zein solutions are filtered and also there may be various other processing steps before use such as mixing with added ingredients. By the time these operations are complete, the zein often has begun to gel and the solutions are of no value.

One object of my invention is to provide a method of reducing the tendency of zein solutions to gel so as to make possible their storage for as much as 5 to 10 days without undergoing an appreciable change in viscosity. Other objects of my invention will appear herein.

I have found that the incorporation of a small amount of soluble thiocyanate salt in a zein solution neutralizes the tendency of such a solution to increase in viscosity and eventually gel so that the solution may be employed commercially. Zein solutions prepared according to my invention are sufficiently stable to provide ample time for processing prior to its employment commercially such as for coating, plastics or textiles. I have found that ordinarily it is only necessary to incorporate 1 to 10% of a soluble thiocyanate salt based on the weight of the zein into the zein solution to stabilize the solution against gelling for relatively long periods. In general, the greater concentration of thiocyanate employed, the greater will be the effect in stabilizing the solution. For most purposes, however, from 1 to 10% of thiocyanate, based on the weight of zein, is satisfactory as this range of concentration will give adequate stability. Obviously, if a less degree of stability is desired, a proportion of thiocyanate of less than 1% may be incorporated in the zein solution.

My invention is especially applicable to the stabilization of solutions employing a mixture of water and a lower aliphatic ketone or a lower monohydroxy aliphatic alcohol. For instance, some of the solvents which are suitable for forming solutions of zein are aqueous acetone, methyl alcohol, ethyl alcohol or isopropyl alcohol. A mixture of 85 parts acetone and 15 parts of water is an excellent solvent for zein but the solution will gel in about 48 hours. Also aqueous alcohols readily dissolve zein so that a clear low viscosity solution or dope is formed, particularly if the alcohol or acetone constitute 85 to 90% of the solution.

The only criterion as to the thiocyanate salt which is suitable for use for stabilizing zein solutions is that it is soluble therein. The thiocyanates employed may be of a monovalent positive ion as represented by lithium, sodium, potassium, rubidium, cesium, ammonium, methylamine, and the like. The thiocyanates of the divalent metals are also very effective in their stabilizing action. Some of the thiocyanates of this type which may be employed are those of calcium, magnesium, strontium, barium, zinc, cadmium, manganese, cobalt and nickel. Because of their low price and lack of color, it is preferred to use calcium thiocyanate, magnesium thiocyanate, sodium thiocyanate or potassium thiocyanate ordinarily as the stabilizer in a zein solution. By incorporating one of these thiocyanates in a zein solution, I have found that, whereas gelling would take place in 24 to 48 hours, in its absence the thiocyanate delays the gel formation for 8 to 10 days.

The following examples illustrate the stabilizing of zein solutions with thiocyanates in accordance with my invention:

Example 1

A solution was prepared having the following composition:

| | Parts |
|---|---|
| Zein | 30 |
| Acetone | 85 |
| Water | 15 |
| Calcium thiocyanate | 3 |

The solution was allowed to stand at room temperature in a closed container. After 7 days there was no evidence of gel formation and the viscosity was essentially unchanged. A similar zein solution containing no thiocyanate gelled in 48 hours. A similar solution containing one instead of three parts of calcium thiocyanate was stable for 4 days and showed a slight gel formation on the 5th day.

Example 2

A solution was made up of the following constituents:

| | Parts |
|---|---|
| Zein | 30 |
| Ethyl alcohol | 90 |
| Water | 10 |
| Potassium thiocyanate | 2 |

The solution did not gel until the 5th day whereas a similar solution containing no thiocyanate gelled on the 3d day.

Example 3

A coating dope was made as follows:

| | Parts |
|---|---|
| Zein | 35 |
| Acetone | 87 |
| Water | 13 |
| Calcium thiocyanate | 2 |

The solution was filtered and then mixed with 6 parts of diethylene glycol, 10 parts of zinc oxide pigment and 0.1 part of dyestuff. The solution was coated out onto cotton cloth and formed a glossy finished fabric.

The zein solutions prepared in accordance with my invention may be employed for the preparation of threads or filaments as well as for coating various surfaces such as cloth, paper, or the like. If desired, materials such as pigments, plasticizers, fillers, dyestuffs and colloidal materials may be incorporated therein to impart added characteristics, depending upon the use to which the zein solutions are to be put.

I claim:

1. A commercially useful solution of zein in a mixture of water and a water-miscible solvent selected from the group consisting of methyl alcohol, ethyl alcohol, isopropyl alcohol and acetone, from which solution zein tends to gel containing a water-soluble thiocyanate in sufficient amount to retard increase in viscosity of the zein solution upon standing.

2. A commercially useful solution of zein in a mixture of water and a water-miscible solvent selected from the group consisting of methyl alcohol, ethyl alcohol, isopropyl alcohol and acetone, from which solution zein tends to gel containing sodium thiocyanate in sufficient amount to retard increase in viscosity of the zein solution upon standing.

3. A composition of matter comprising a commercially useful solution of zein in a mixture of water and a water-miscible solvent therefor, selected from the group consisting of methyl alcohol, ethyl alcohol, isopropyl alcohol and acetone, from which solution zein tends to gel, and calcium thiocyanate in sufficient amount to retard the increase in viscosity of the zein solution upon standing.

4. A solution of zein in aqueous acetone containing therein a sufficient amount of a water-soluble thiocyanate salt to retard the increase in viscosity of the zein solution upon standing.

5. A solution of zein in aqueous alcohol containing therein a sufficient amount of a water-soluble thiocyanate salt to retard the increase in viscosity of the zein solution upon standing.

JOHN R. CALDWELL.